US011021297B2

(12) United States Patent
Lindbo et al.

(10) Patent No.: US 11,021,297 B2
(45) Date of Patent: Jun. 1, 2021

(54) GOODS DELIVERY SYSTEMS

(71) Applicant: OCADO INNOVATION LIMITED, Hatfield (GB)

(72) Inventors: Lars Sverker Ture Lindbo, Hatfield (GB); Paul Stewart, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 29 days.

(21) Appl. No.: 16/080,521

(22) PCT Filed: Feb. 28, 2017

(86) PCT No.: PCT/EP2017/054567
§ 371 (c)(1),
(2) Date: Aug. 28, 2018

(87) PCT Pub. No.: WO2017/148895
PCT Pub. Date: Sep. 8, 2017

(65) Prior Publication Data
US 2019/0062000 A1   Feb. 28, 2019

(30) Foreign Application Priority Data

Feb. 29, 2016 (GB) .................................. 1603517

(51) Int. Cl.
*B65D 25/02* (2006.01)
*B65D 25/00* (2006.01)
*B65D 6/06* (2006.01)
*B65D 21/02* (2006.01)

(52) U.S. Cl.
CPC ............ *B65D 25/005* (2013.01); *B65D 11/12* (2013.01); *B65D 21/0209* (2013.01); *Y02W 30/80* (2015.05)

(58) Field of Classification Search
CPC ............ B65D 25/005; B65D 21/0209; Y02W 30/807
USPC ...................................................... 280/79.11
See application file for complete search history.

(56) References Cited

U.S. PATENT DOCUMENTS

| 3,003,839 | A | 10/1961 | Bloom et al. |
| 3,421,801 | A | 1/1969 | Carpenter et al. |
| 3,918,781 | A | 11/1975 | Paris |
| 4,413,867 | A | 11/1983 | Mosebrook et al. |
| 4,519,503 | A | 5/1985 | Wilson |

(Continued)

FOREIGN PATENT DOCUMENTS

| CH | 239917 A | 11/1945 |
| CN | 204641811 U | 9/2015 |

(Continued)

OTHER PUBLICATIONS

Intellectual Property Office Search Report dated Jun. 8, 2017.
(Continued)

*Primary Examiner* — Stephen J Castellano
(74) *Attorney, Agent, or Firm* — Buchanan Ingersoll & Rooney PC

(57) ABSTRACT

The present invention relates to containers which can be stacked one on top of another whilst still permitting easy access to the contents of any container within the stack without the need for de-stacking. The contents of the containers remain secured within the container.

7 Claims, 12 Drawing Sheets

(56) References Cited

U.S. PATENT DOCUMENTS

Figure 1:
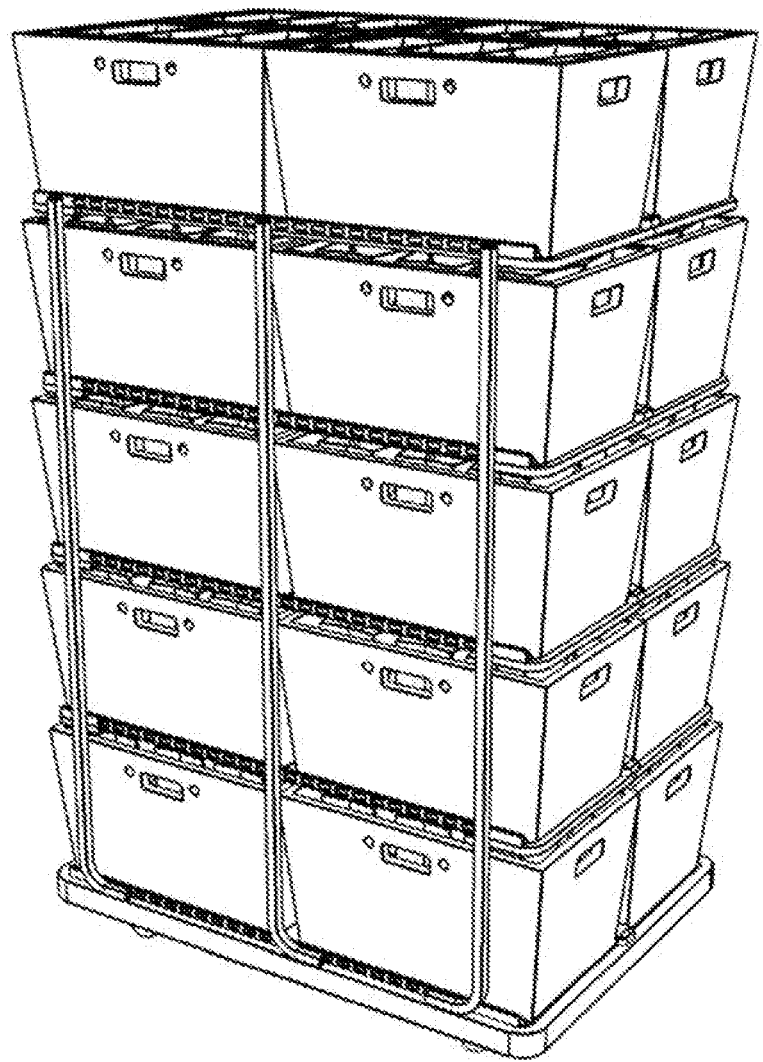

| | | | | |
|---|---|---|---|---|
| 4,566,588 | A | * | 1/1986 | Kataczynski ...... B65D 71/0096 206/3 |
| 5,285,900 | A | | 2/1994 | Swingler |
| 6,550,794 | B1 | | 4/2003 | Spindel et al. |
| 8,485,134 | B2 | * | 7/2013 | Dorsey ............... A01K 1/0245 119/453 |
| 9,527,205 | B1 | * | 12/2016 | Lin ........................ B25H 1/12 |
| 2005/0224384 | A1 | * | 10/2005 | Sands .................. A61B 50/31 206/503 |
| 2007/0084864 | A1 | | 4/2007 | Thrush et al. |
| 2010/0006467 | A1 | | 1/2010 | Joseph et al. |
| 2014/0033956 | A1 | | 2/2014 | Kelly et al. |
| 2015/0021329 | A1 | | 1/2015 | Darmon |
| 2015/0232238 | A1 | | 8/2015 | Wu |
| 2016/0272369 | A1 | | 9/2016 | Hsu |
| 2017/0150813 | A1 | * | 6/2017 | Stares .................. A47B 67/04 |

FOREIGN PATENT DOCUMENTS

| | | |
|---|---|---|
| CN | 107215527 A | 9/2017 |
| DE | 2007001796 U1 | 4/2007 |
| DE | 202014001386 U1 | 4/2014 |
| EP | 0524659 A1 | 1/1993 |
| EP | 0791312 A2 | 8/1997 |
| FR | 2407137 A1 | 5/1979 |
| GB | 2114544 A | 8/1983 |
| GB | 2145063 A | 3/1985 |
| JP | 2018-110666 A | 7/2018 |
| WO | 2015/124562 A1 | 8/2015 |
| WO | 2015134067 A1 | 9/2015 |

OTHER PUBLICATIONS

International Search Report (PCT/ISA/210) dated Mar. 27, 2017, by the European Patent Office as the International Searching Authority for International Application No. PCT/EP2017/054567.

Written Opinion (PCT/ISA/237) dated Mar. 27, 2017, by the European Patent Office as the International Searching Authority for International Application No. PCT/EP2017/054567.

PCT International Preliminary Report on Patentability (IPRP) and Written Opinion dated Mar. 27, 2017 in corresponding International Application No. PCT/EP2017/054567 (12 pages).

Combined Search and Examination Report under Sections 17 and 18(3) issued by the Intellectual Property Office in corresponding British Application No. 1703170.9 dated Jun. 9, 2017 (7 pages).

Examination Report under Section 18(3) issued by the Intellectual Property Office in corresponding British Application No. 1703170.9 dated Jan. 8, 2020 (3 pages).

Examination Report under Section 18(3) issued by the Intellectual Property Office in corresponding British Application No. 1703170.9 dated Apr. 30, 2020 (2 pages).

Examination Report under Section 18(3) issued by the Intellectual Property Office in corresponding British Application No. 1703170.9 dated Jul. 8, 2019 (2 pages).

Examination Report under Section 18(3) issued by the Intellectual Property Office in corresponding British Application No. 1703170.9 dated Jul. 10, 2020 (2 pages).

* cited by examiner

GOODS DELIVERY SYSTEMS

This application is the national stage (Rule 371) of international application No. PCT/EP2017/054567 filed Feb. 28, 2017.

The present invention relates to re-usable containers which can be stacked one on top of another whilst still permitting easy access to the contents of any container within the stack without the need for de-stacking and the use of these containers in goods delivery systems.

A range of different types of either fully or semi-automated order processing and fulfillment systems are known.

In one known type of order picking system, a customer's order is assembled into one or more tote, bin, box, bag, crate, sac, pouch or some other re-usable container.

Each re-usable container may contain one or more item or bag for the same customer as would be the case in online grocery retail.

Alternatively each re-usable container may contain one or more parcel for the same or different recipients on the same route, as would the case for general merchandise parcel distribution.

After all the re-usable containers for a single delivery vehicle have been filled, they are loaded onto said delivery vehicle.

The re-usable containers are loaded either directly into or onto a delivery vehicle at the order picking facility or alternatively in what is hereinafter known as a hub- and spoke system the re-usable containers are loaded onto an intermediary carrier, such as a pallet, dolly or roll cage.

The intermediary carriers are loaded into or onto a distribution vehicle and transported to a subsidiary site where the re-usable containers are unloaded from the intermediary carrier and transferred to one or more delivery vehicle.

In either system the reusable-containers are usually loaded manually onto racking or shelving located within the delivery vehicle. Although this method has the benefit of being flexible for reusable-containers of different sizes, it is labour intensive and requires the delivery vehicles to occupy a loading dock at the order picking facility, or the subsidiary site for a relatively lengthy dwell time.

In conventional handling systems roll cages are employed to minimize the dwell time in a loading dock. The roll cages can be pre-filled away from the loading dock and stored waiting for the right vehicle to be presented at a loading dock.

The entire roll cage or its individual contents can then be more rapidly loaded into the vehicle.

In another conventional handling system the reusable containers are stacked on top of each other on dollies. The stacks with or without the dollies can then be more rapidly loaded into a delivery vehicle however this system creates problems when deliveries need to be made out of a pre-determined sequence.

Further disadvantages of this system include the need to store the empty containers generated after each delivery within the delivery vehicle, also it becomes increasingly difficult to properly secure the remaining load as some stacks are more or less depleted.

A yet further disadvantage of all of these systems which makes them particularly ill suited to a hub-and-spoke system, is that the re-usable containers must first be loaded onto or into pallets, dollies or roll cages at the order-picking facility then unloaded and re-loaded onto or into individual delivery vehicles at the subsidiary site which increases costs, handling times and the potential for errors in the orders and damage to the goods.

A need exists for an efficient order processing system for picking, filling, storing and distributing orders that avoids the need for repeatedly stacking and de-staking re-usable containers and keeps loading dock dwell times to a minimum.

The present invention relates to a re-usable, stackable container for use in a goods handling system wherein the interior of the container is accessible when two or more containers are stacked together.

In a preferred aspect the container comprises 5 closed sides.

In another preferred aspect the container has an inner part slidably engaged within an outer part to allow the container to be opened and closed.

In a further preferred aspect 1 or more side of the inner part has an opening to allow access to the interior of the inner part.

In another preferred aspect one or more side of the container is movable to allow access to the interior of the container.

In another aspect the invention relates to a single movable unit comprising 2 or more stacks of containers.

In a preferred aspect the single movable unit further comprises one or more dolly.

In another preferred aspect the stacks are secured together by one or more strap.

In another preferred aspect two or more dollies are releasably locked together.

In a further aspect the invention relates to goods handling system comprising a multiplicity of re-usable, stackable containers.

In further aspect the invention relates to a goods handling system comprising single movable unit.

In this way, the present invention overcomes the problems of the prior art and provides an efficient goods handling system which avoids the need for repeated stacking and de-stacking of containers.

Figure 2:
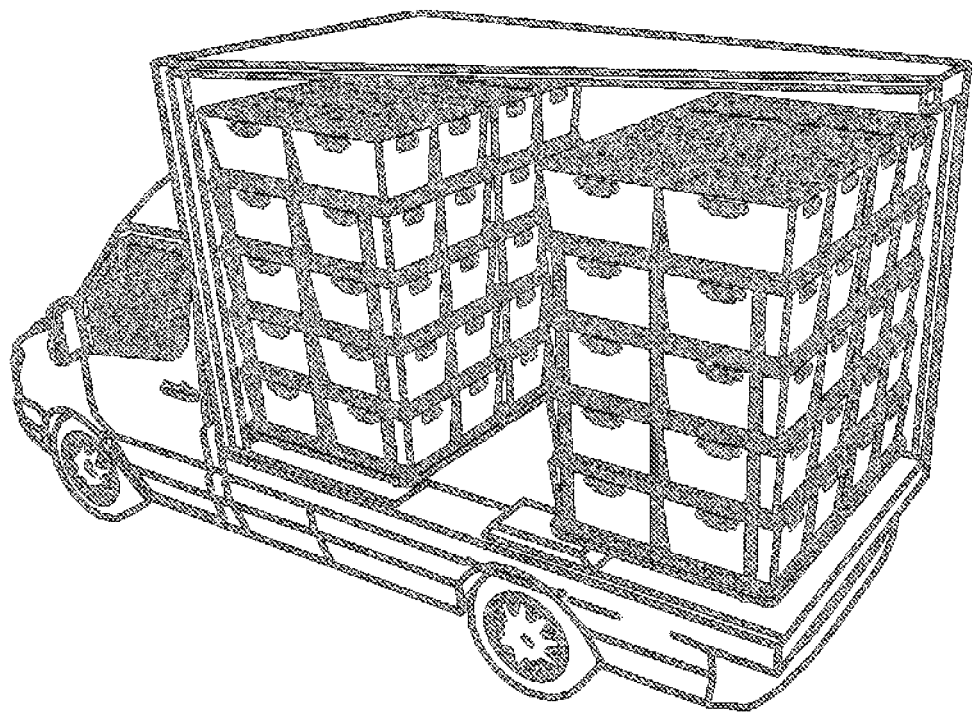

The invention will now be described with reference to the accompanying diagrammatic drawings in which:

FIG. 1: is a schematic perspective view of a conventional roll cage containing four stacks of re-usable containers FIG. 2: is a schematic perspective view of a conventional delivery vehicle showing the arrangement of four conventional roll cages within the vehicle.

Figure 3A:
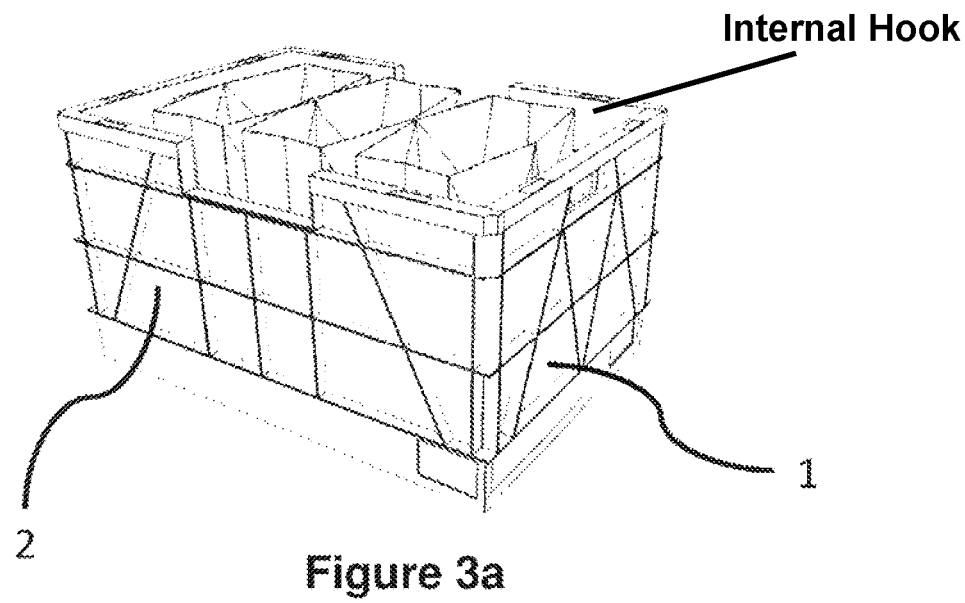
Figure 3B:
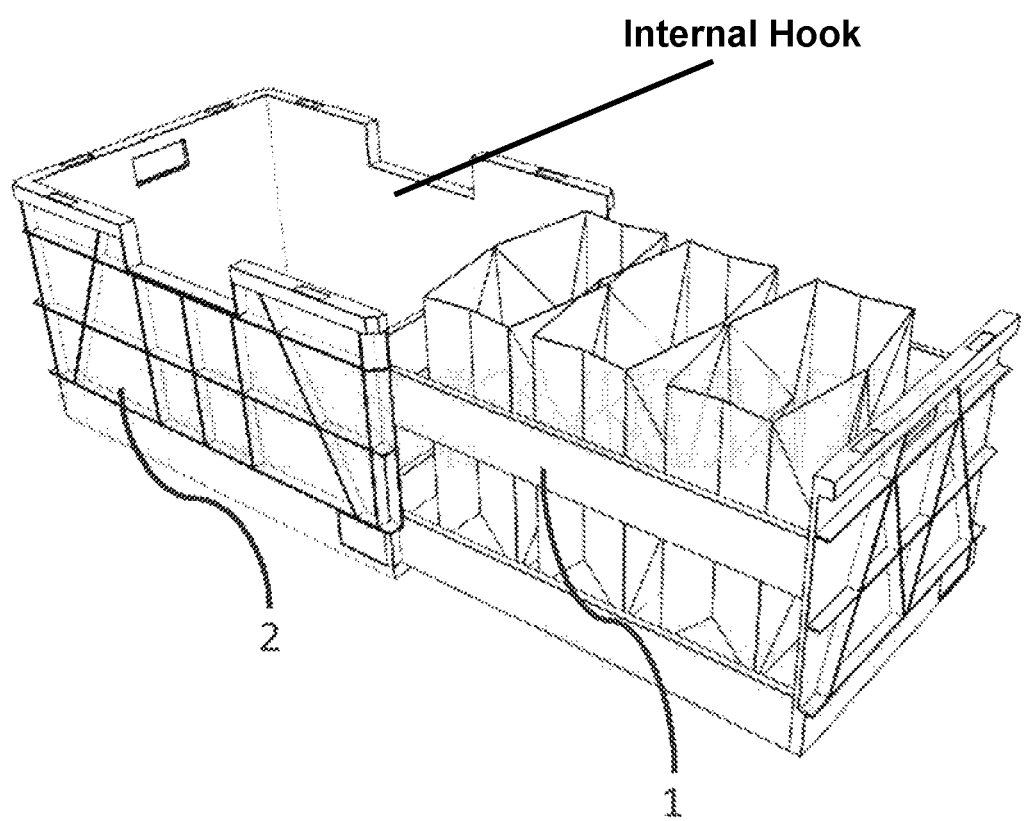

FIGS. 3*a* and 3*b*: are a schematic perspective views of a re-usable container according to a first embodiment of the present invention having an inner part 1 and an outer part 2 wherein the inner portion is adapted to slide into and out of the outer part to close and open like a drawer.

Figure 3C:
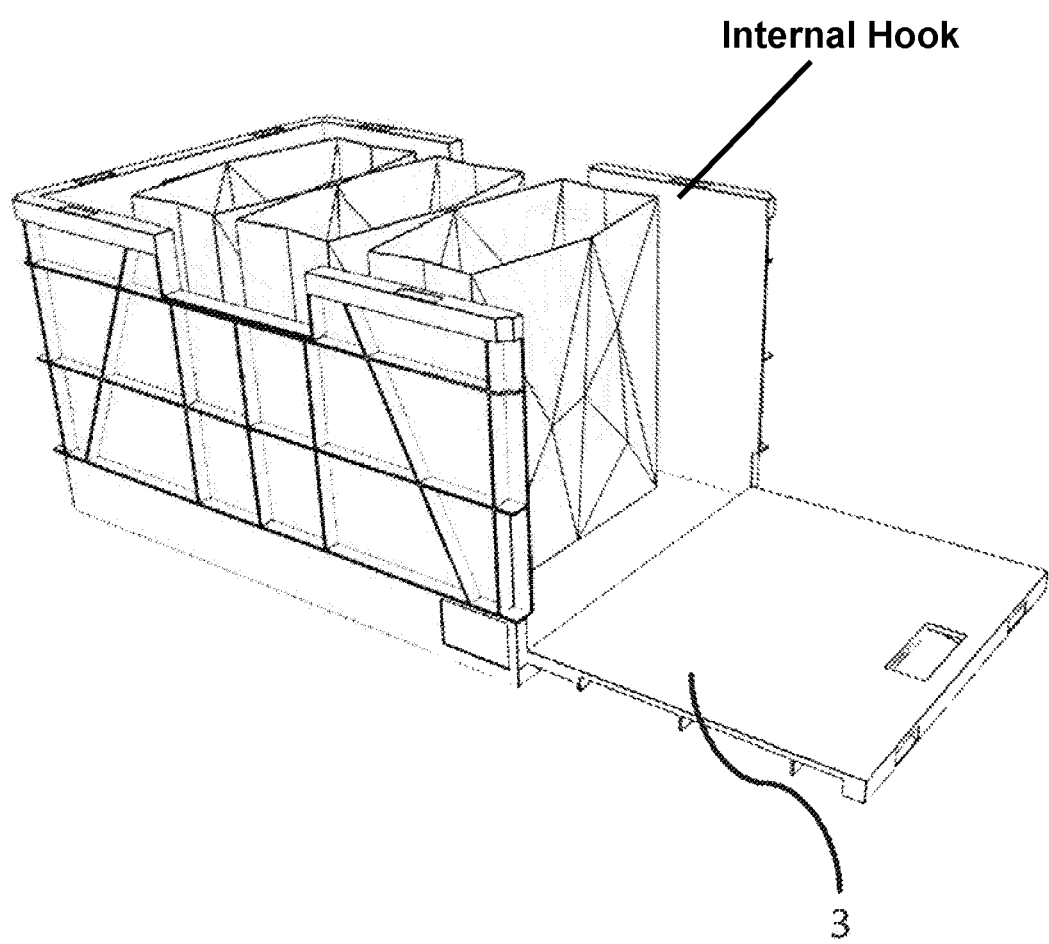

FIG. 3*c*: is a schematic perspective view of a re-usable container according to a second embodiment of the present invention having a movable side 3.

Figure 4:
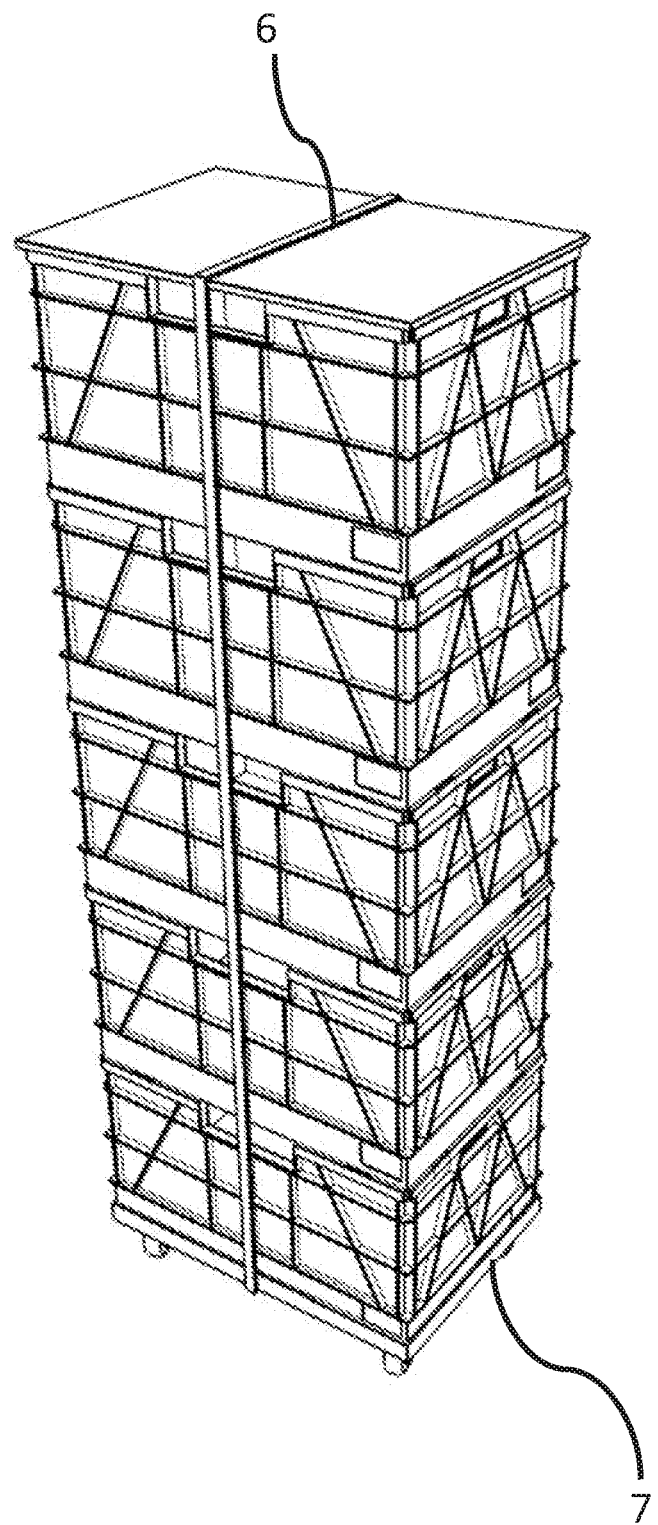

FIG. 4: is a schematic perspective view of a stack of five containers according to the present invention loaded on a dolly 7 and secured by a strap 6.

Figure 5:
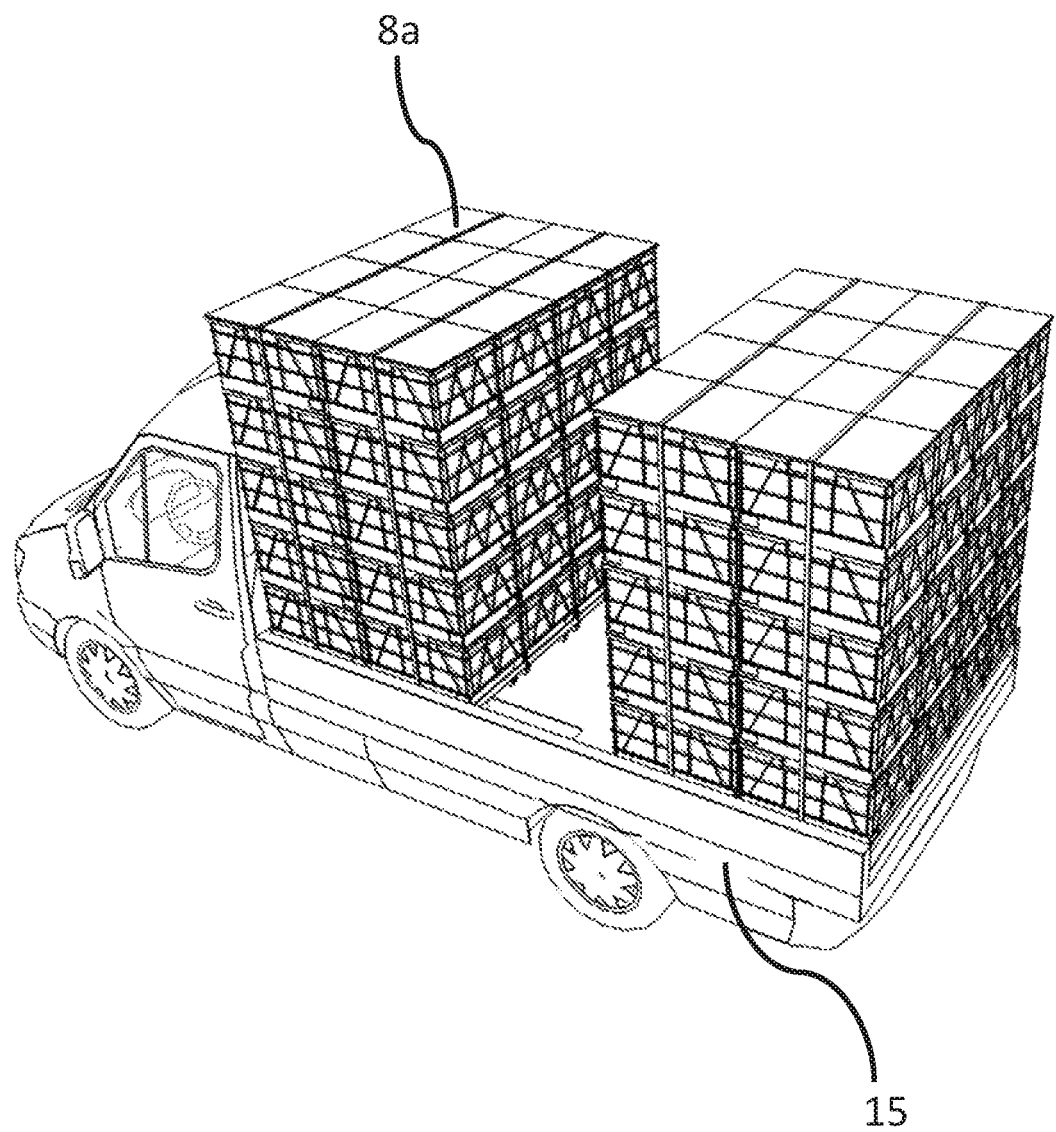
Figure 6:
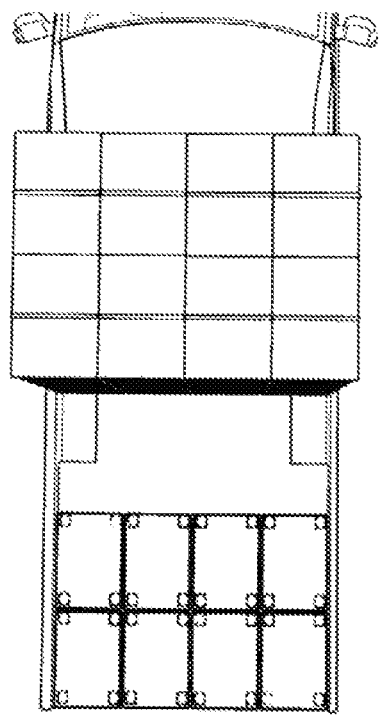
Figure 7:
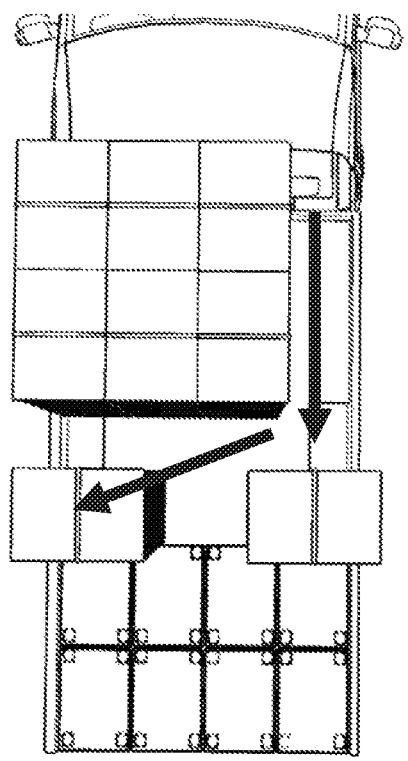
Figure 8:
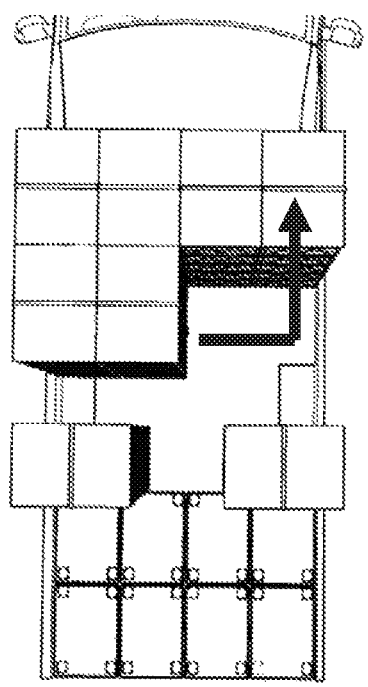
Figure 9:
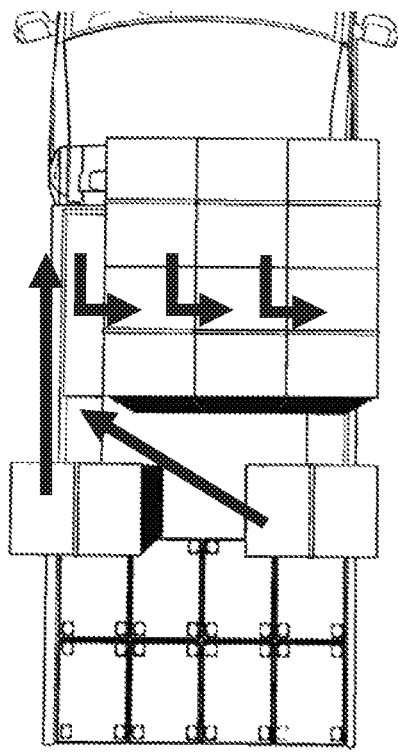

FIG. 5: is a schematic perspective view showing how multiple loaded dollies may be arranged in a delivery vehicle.

FIGS. 6-9: are a series of schematic perspective views of a delivery vehicle showing how the dollies may be arranged and re-arranged inside the delivery vehicle to allow access to each of eight stacks.

Figure 10:
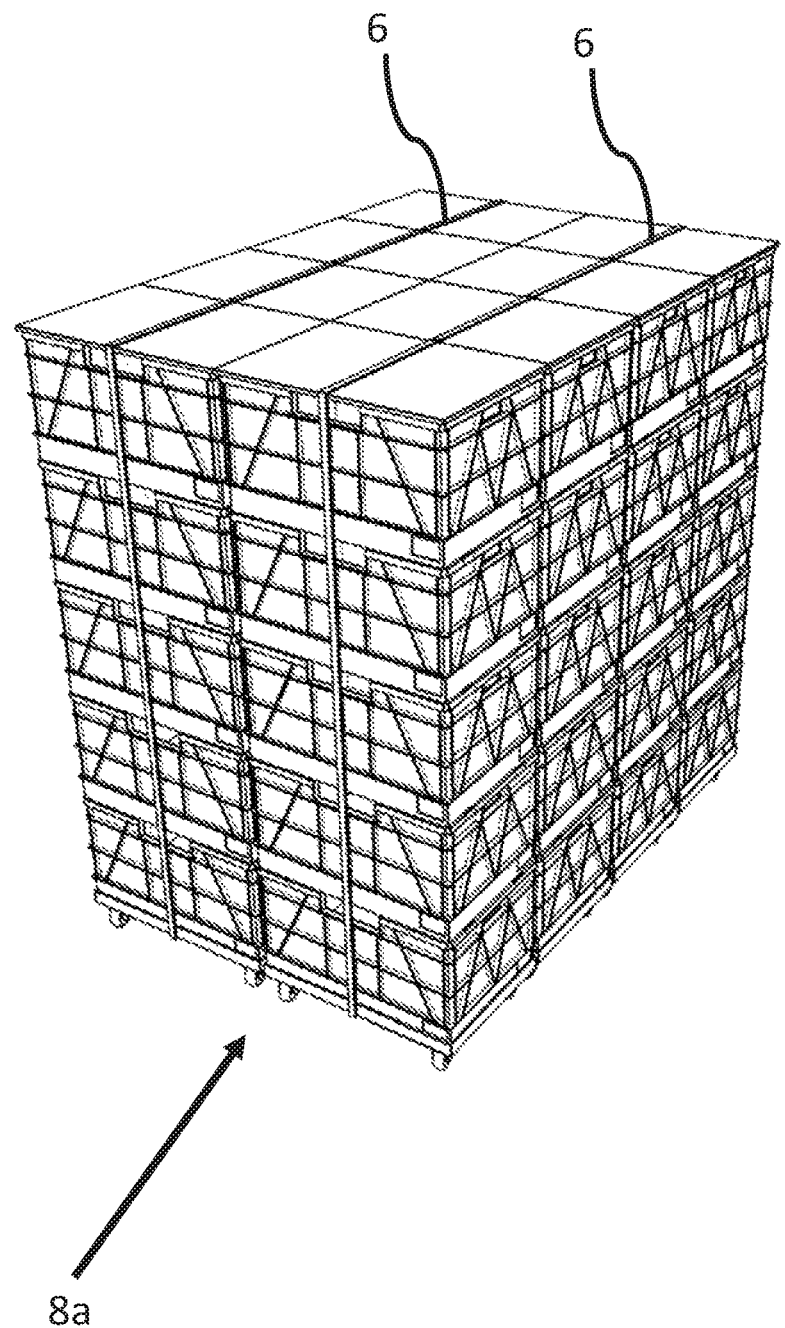

FIG. 10: is a schematic perspective view of four dollies each loaded with five containers and secured together by straps 6 (and having a mechanism not shown for locking the dollies together) to form a single, stable, movable unit 8*a*.

Figure 11:
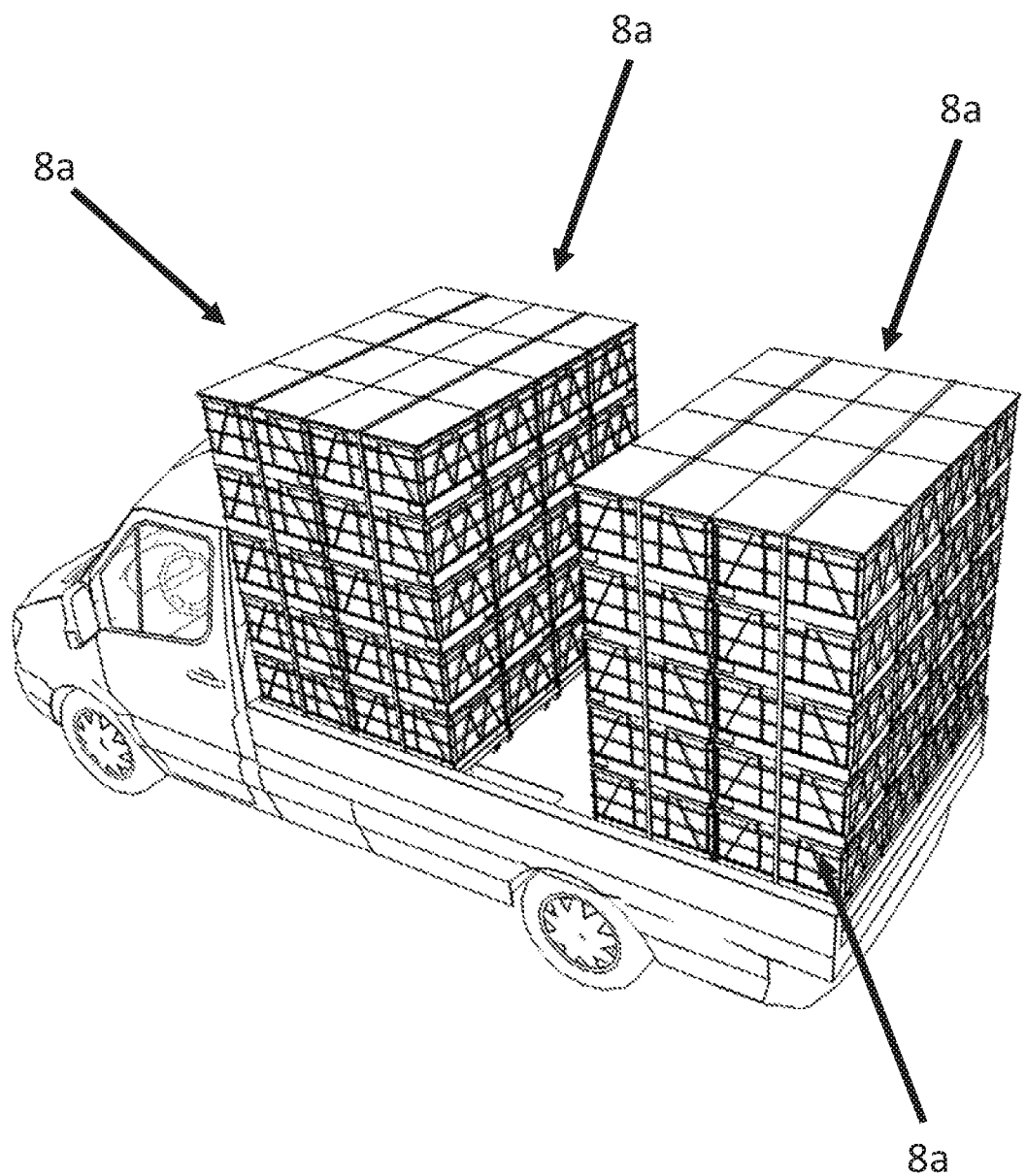

FIG. 11: is a schematic perspective view of a distribution vehicle loaded with a multiplicity of the units 8a depicted in FIG. 10.

Figure 12:
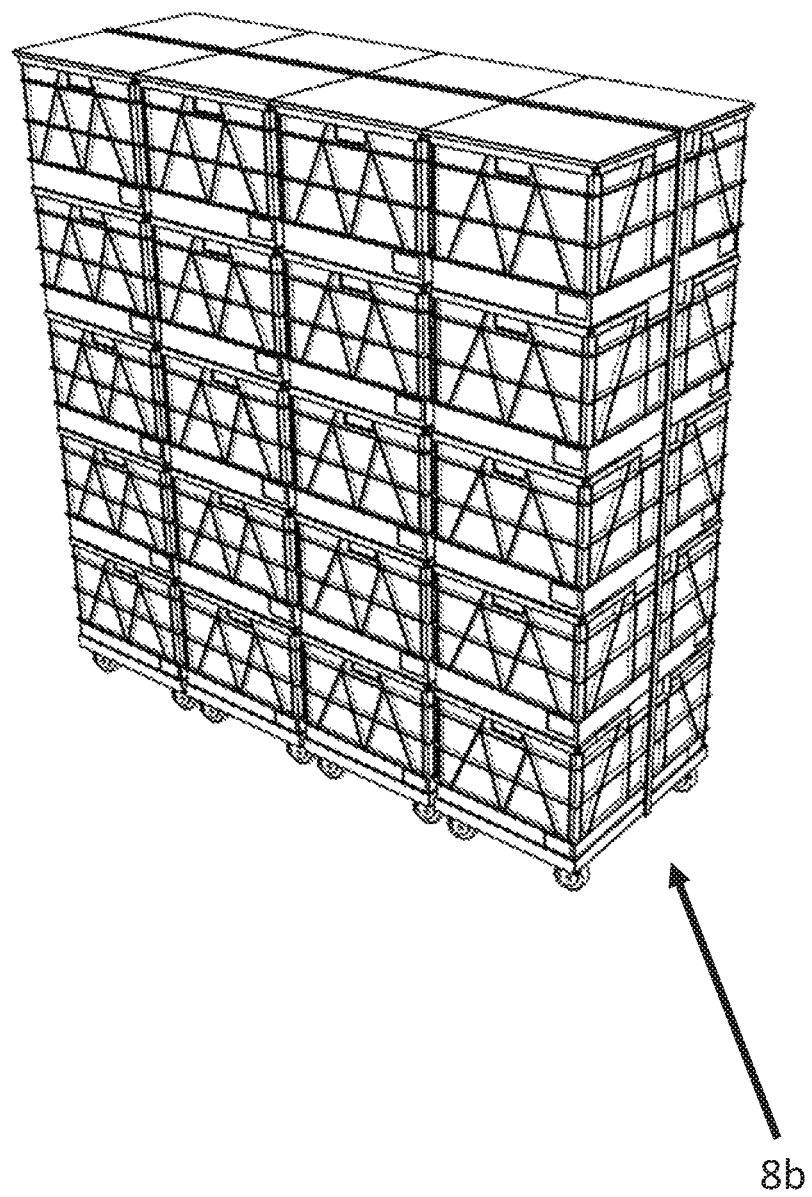

FIG. 12: is a schematic perspective view of an alternative arrangement wherein a single large dolly 9 is loaded with four stacks of five re-usable containers in a 4×1 configuration to form a single, stable, movable unit 8b.

Figure 13:
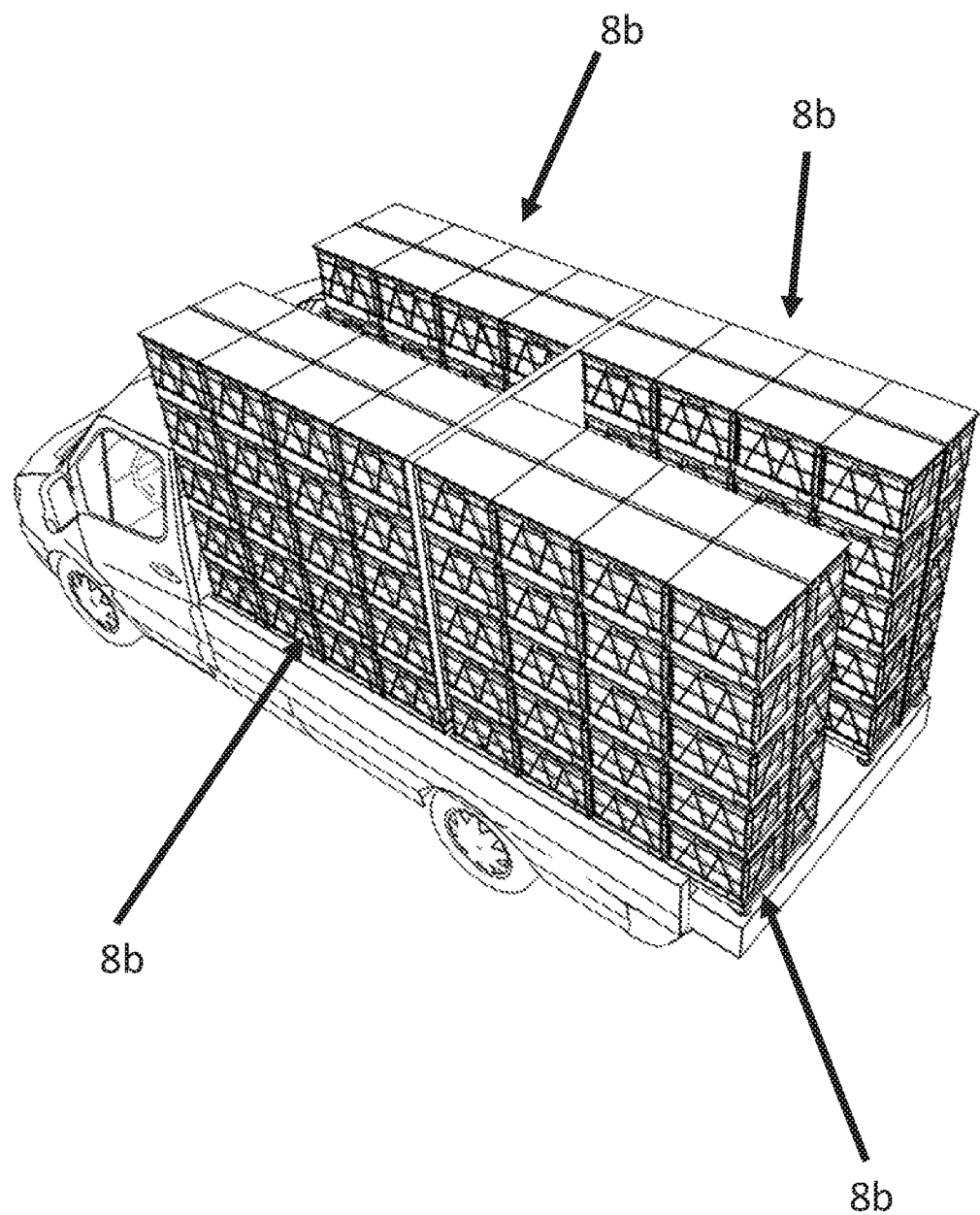

FIG. 13: is a schematic perspective view of a delivery vehicle showing how multiple movable units 8b may be arranged inside the delivery vehicle to allow access to each of sixteen stacks; and Referring to FIG. 3 the re-usable containers of the present invention comprise open topped crates or boxes having five closed sides. The containers are shaped and sufficiently strong to allow several filled containers to be stacked on top of one another to form a single stack.

The containers in a single stack may be of the same or of different lengths, widths and heights.

The open top or sixth side enables the containers to be quickly and easily filled prior to stacking, with one or more items, goods, bags or parcels to form a part of an order, a single order or several orders.

The containers of the present invention may be moved manually, using bin stackers or Bots or any suitable technology or method.

Optionally the containers have openings 10 on one or more sides to provide hand holds which are helpful when moving the containers and during stacking and de-stacking.

The size and shape of these openings 10 is dependent on whether the containers are intended to be moved manually, using bin stackers or Bots or any suitable technology or method or combinations thereof.

In the preferred embodiment shown in FIG. 3a the container comprises an inner part 1 and an outer part 2. The inner part can be moved from a first position where it is located within the outer part to a second position where a substantial part of the inner part extends beyond the outer part, to open and close the re-usable container. The movement of the inner part from the first retracted position to the second extended position may be effected by sliding the inner part out of the outer part like a drawer.

Although it is possible to move the inner part to the second extended position prior to stacking the container is generally in the first, closed or retracted position when it is being filled prior to stacking.

After the container has been filled and stacked the contents of any container within the stack are accessible by moving the inner part to the second extended position without the need for de-stacking.

A locking mechanism may be provided to secure the inner part in the first, closed or retracted position.

Optionally one or more side of the inner part has an opening 12 to allow the contents of the inner part to be accessed from two or more directions.

In another preferred embodiment shown in FIG. 3c the re-usable container includes one or more movable side or hatch 3 which can be moved to allow the contents of the container to be accessed without the need for de-stacking.

Preferably the side or hatch 3 is slidable or hinged. More preferably the side or hatch 3 is located on the short side or sides of the re-usable container.

In a preferred embodiment the re-usable containers have one or more internal hooks on which bags can be hung or otherwise secured.

As shown in FIGS. 4, 10 and 12 one or more stack are loaded onto one or more dolly 7 or 9 to form a single movable unit 8a or 8b.

Referring to FIGS. 10 and 12 four stacks are joined together to form a single movable unit 8a or 8b.

Any other number of stacks such as 2, 3, 5, 6, 7, 8, 9 or more can be joined together to form a single stable movable unit.

If multiple separate dollies 7 are used to form a single movable unit 8a as shown in FIG. 10 the dollies are securely joined together by one or more interlocking mechanism.

Referring to FIGS. 4 and 10 preferably the one or more stacks of multiple re-usable containers are held together using one or more strap 6.

The strap or straps are arranged horizontally and or vertically around the stack.

Optionally a lid may be placed on the top container in a stack before the strap 6 is applied to increase the strength of the container or to help stabilize the stack or to prevent moisture from any refrigeration system from dripping onto the container's contents.

One or more single movable unit can be rapidly loaded directly onto a delivery vehicle 15 at the order picking facility.

Alternatively in a hub-and-spoke system one or more single movable unit can be rapidly loaded onto a distribution vehicle at the order picking facility and conveyed to a subsidiary site.

At the subsidiary site one or more of the single movable units can be rapidly loaded onto a onto a delivery vehicle without the need for de-stacking.

FIGS. 6-9 illustrate how eight dollies may be arranged and re-arranged inside a delivery vehicle. This allows easy access to the contents of any container in each of the eight stacks, and permits orders to be accessed and delivered in any sequence and removes the need for a predetermined delivery sequence.

Many variations and modifications not explicitly described above are also possible without departing from the scope of the invention as defined in the appended claims.

The invention claimed is:

1. A re-usable, stackable container configured for a goods handling system, the container comprising:
    an inner part and an outer part, the inner part being slidably engaged within the outer part and slidable between a first position in which the inner part is located substantially within the outer part and a second position in which a substantial portion of the inner part extends beyond the outer part, whereby an interior of the container is accessible by relative sliding movement of the inner part and the outer part into the second position;
    an open top and five closed sides including four side walls and a base located substantially at bottoms of the four side walls, three of the four side walls being provided by the outer part, the base and one of the four side walls being provided by the inner part and each of the side walls having substantially a same height such that, when the inner part is in the first position, the side wall provided by the inner part is positioned adjacent to two of the three side walls provided by the outer part so that the four side walls are substantially continuous and define an aperture of the open top of the container, the inner part and the outer part being configured such that, when the container is stacked with one or more containers, goods stored therein remain within the container; and
    at least one internal hook configured to support at least one bag, wherein the inner part includes two inner part side walls arranged perpendicular to the base, at least one of the two inner part side walls having an opening configured to allow access to goods arranged in an interior of the inner part.

2. A single movable unit comprising:

2 or more stacks of containers, each container being configured according to claim 1.

3. A single movable unit as claimed in claim 2, comprising:

at least one dolly.

4. A single movable unit as claimed in claim 3, wherein the stacks are secured together by at least one strap.

5. A single movable unit as claimed in claim 4, comprising:

two or more dollies releasably locked together.

6. A goods handling system comprising:

a single movable unit as claimed in claim 2.

7. A goods handling system, comprising:

plural re-usable, stackable containers, each container being configured according to claim 1.

\* \* \* \* \*